(12) United States Patent
Kum et al.

(10) Patent No.: US 7,776,489 B2
(45) Date of Patent: Aug. 17, 2010

(54) FUEL CELL STACK CLAMPING DEVICE

(75) Inventors: Young Bum Kum, Seoul (KR); Sae Hoon Kim, Gyeonggi-do (KR); Yoo Chang Yang, Gyeonggi-do (KR); Sung Ho Lee, Gyeonggi-do (KR); Jung Do Suh, Seoul (KR); Chul Ho Yim, Gyeonggi-do (KR); Ji Hoon Jeon, Gyeongsangbuk-do (KR); Woon Bong Hwang, Gyeongsangbuk-do (KR); Sang Min Lee, Gyeongsangbuk-do (KR); Chang Woo Lee, Gyeongsangbuk-do (KR); Seong Jin Cho, Gyeongsangbuk-do (KR)

(73) Assignees: Hyundai Motor Company, Seoul (KR); Pohang University of Science and Technology, Gyeongsangbuk-do (KR)

( * ) Notice: Subject to any disclaimer, the term of this patent is extended or adjusted under 35 U.S.C. 154(b) by 137 days.

(21) Appl. No.: 12/228,644

(22) Filed: Aug. 14, 2008

(65) Prior Publication Data

US 2009/0226794 A1    Sep. 10, 2009

(30) Foreign Application Priority Data

Mar. 4, 2008    (KR) .................... 10-2008-0019887

(51) Int. Cl.
*H01M 2/04* (2006.01)

(52) U.S. Cl. ..................................... 429/511
(58) Field of Classification Search ................. 429/37
See application file for complete search history.

(56) References Cited

FOREIGN PATENT DOCUMENTS

| JP | 06-188023 | 7/1994 |
|----|-----------|--------|
| JP | 09-283171 | 10/1997 |
| JP | 2000-067902 | 3/2000 |
| JP | 2002-063929 | 2/2002 |
| JP | 2002-063930 | 2/2002 |
| JP | 2004-327125 | 11/2004 |

OTHER PUBLICATIONS

Machine translation of JP06-188023 listed in applicant's IDS.*

* cited by examiner

*Primary Examiner*—Patrick Ryan
*Assistant Examiner*—Ashley Kwon
(74) *Attorney, Agent, or Firm*—Edwards Angell Palmer & Dodge LLP; Peter F. Corless; Kongsik Kim

(57) ABSTRACT

A clamping device includes an oblique device and a unidirectional load control plate disposed on the outside of the fuel cell stack, not on the inside of the fuel cell stack. The device can automatically compensating the surface pressure in the fuel cell stack to be maintained constant, and provide a large clamping load with a small force using the load of the fuel cell stack.

9 Claims, 5 Drawing Sheets

Prior Art

$$R \cos \frac{\phi}{2} = \frac{P}{2 \tan \frac{\phi}{2}}$$
$$= \frac{P}{2 \tan(90 - \theta)}$$
$$= \frac{P \tan \theta}{2}$$
$$= kP$$

FUEL CELL STACK CLAMPING DEVICE

CROSS-REFERENCE TO RELATED APPLICATION

This application claims under 35 U.S.C. §119(a) the benefit of Korean Patent Application No. 10-2008-0019887 filed Mar. 4, 2008, the entire contents of which are incorporated herein by reference.

BACKGROUND (a) Technical Field

The present invention relates to a fuel cell stack clamping device. More particularly, the present invention relates to a fuel cell stack clamping device, which can automatically compensate the surface pressure in a fuel cell stack to be maintained constant using the load of the fuel cell stack and an inclination of an oblique device.

(b) Background Art

Generally, a fuel cell is a device that generates electrical energy through an electrochemical reaction between hydrogen ($H^2$) and oxygen ($O^2$) and includes a membrane electrode assembly (MEA). The MEA includes a fuel electrode (anode) to which hydrogen is supplied and an oxygen electrode (cathode) to which air is supplied, formed on both sides of an electrolyte membrane where hydrogen ions ($H^+$) are transmitted.

A fuel cell stack has a structure in which the MEAs and separators are sequentially stacked, and an end plate, i.e., a bipolar plate, having hydrogen inlet and outlet and air inlet and outlet is disposed on the outermost of the fuel cell stack.

In the fuel cell as described above, an output voltage of the fuel cell stack is the sum of output voltages of unit cells. Since the unit cells divided by the separators are sequentially stacked to form the fuel cell stack, the added output voltages of the respective unit cells are defined as the output voltage of the fuel cell stack.

At the same time, the performance of the fuel cell stack is evaluated by the magnitude of the output voltage, which is affected by a pressure between the separators.

In the fuel cell stack having the above configuration and operation, it is necessary to integrally connect and fix the plurality of stacked cells to prevent leakage of the fuel and form a structure as the fuel cell. Accordingly, there has been employed a method in which the unit cells are clamped with a predetermined pressure through the end plates and an elastic body such as a spring is added to the inside of the fuel cell stack in order to maintain the surface pressure in the fuel cell stack constant even in case of a long term usage.

FIG. 1 shows a conventional clamping structure for maintaining the surface pressure in a fuel cell stack, in which a plate spring 1 and a liquid chamber 2, i.e., an elastic body, are used to provide a uniform surface pressure even in a case where the load of the fuel cell stack is changed.

However, the conventional structure has drawbacks in that a lot of plate springs and liquid chambers are required according to an increase in clamping load inside the separators, thus increasing the manufacturing cost. Moreover, with the plate springs and the liquid chambers included in the fuel cell stack, the inside structure of the fuel cell stack is complicated.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. In one aspect, the present invention provides a fuel cell stack clamping device comprising: an end plate having an inner surface formed in a vertical surface to be closely adhered to both sides of a fuel cell stack module and an outer surface formed in a first oblique; an oblique device coming in surface contact with the first oblique and accommodating the end plate; and first and second unidirectional load control plates connected to the top and bottom surfaces of the end plate respectively such that the load of the fuel cell stack is applied only toward the inside of the fuel cell stack.

In a preferred embodiment, a first hooking member is formed on the top surface of the end plate, a first locking member engaged with the first hooking member is formed in the outside bottom surface of the first unidirectional load control plate, a second hooking member is formed on the bottom surface of the end plate, and a second locking member engaged with the second hooking member is formed on the outside top surface of the second unidirectional load control plate.

In another preferred embodiment, a through-hole for connecting the second unidirectional load control plate is formed on a bottom plate of the oblique device.

In still another preferred embodiment, the fuel cell stack clamping device further comprises a load adding cover including a top plate for covering the top surface of the fuel cell stack module, the end plate, and the oblique device, and a side plate for covering the circumferential surface of the fuel cell stack module, the end plate, and the oblique device.

In yet another preferred embodiment, an open hole, through which hydrogen inlet and outlet and air inlet and outlet of the end plate are exposed to the outside, is formed on the top plate of the load adding cover.

In still yet another preferred embodiment, the side plate of the load adding cover and a body portion of the oblique device are connected by cover fixing means.

In a further preferred embodiment, a vibration absorbing material is disposed between the bottom surface of the top plate of the load adding cover and the top surface of the fuel cell stack module.

In another further preferred embodiment, a plurality of cylindrical rollers are installed on the inner surface of the body portion of the oblique device.

In still another further preferred embodiment, the oblique device includes a body portion in which a second oblique coming in surface contact with the first oblique of the end plate is formed on the inner surface thereof, and a bottom plate for integrally connecting the bottom end of the body portion.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
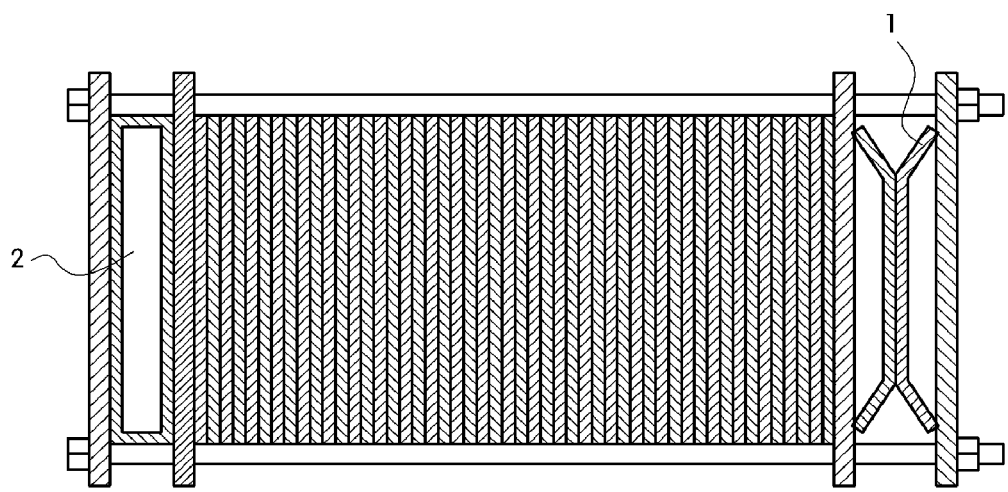
FIG. 1 is a side view illustrating a clamping structure of a conventional fuel cell stack.

Reference numerals set forth in the Drawings includes reference to the following elements as further discussed below:

| | |
|---|---|
| 10: oblique device | 12: fuel cell stack |
| 14: end plate | 18: first oblique |
| 20: body portion | 22: bottom plate |
| 24: second oblique | |
| 26: first unidirectional load control plate | |
| 28: second unidirectional load control plate | |
| 30: first hooking member | 32: first locking member |
| 34: second hooking member | 36: second locking member |
| 38: roller | 40: load adding cover |
| 42: top plate | 44: side plate |
| 39: open hole | 50: vibration absorbing material |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 2:
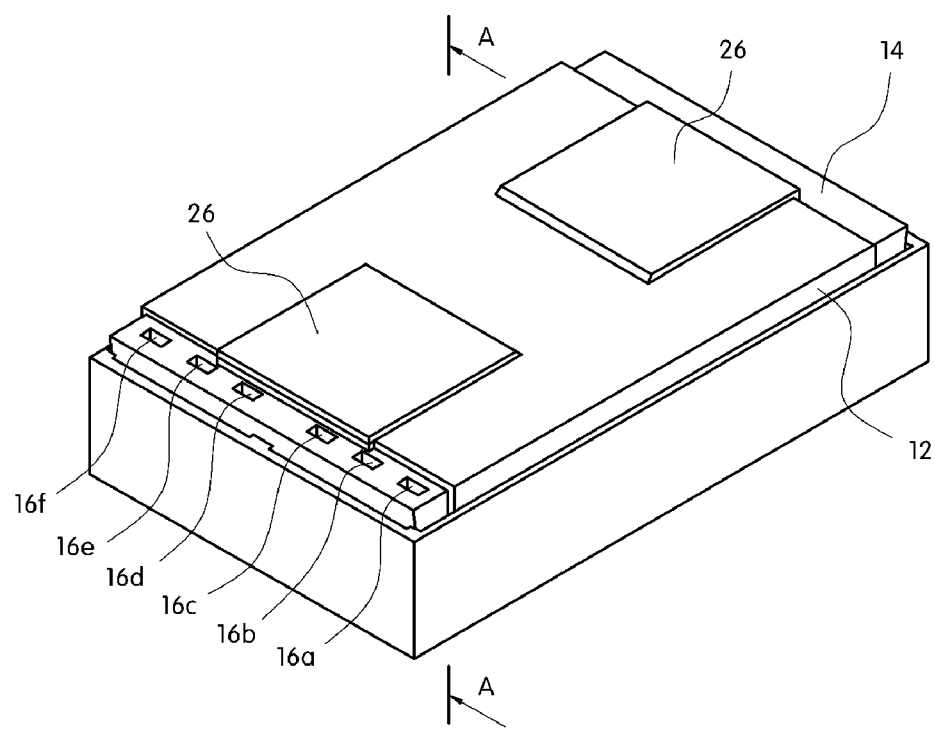
FIG. 2 is a perspective view illustrating a state where a fuel cell stack is assembled by a fuel cell stack clamping device in accordance with a preferred embodiment of the present invention.
Figure 3:
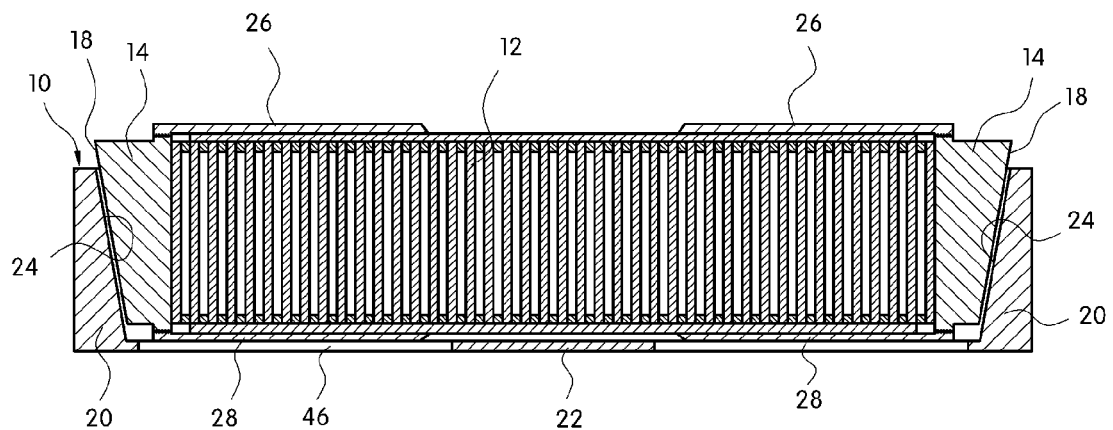
FIG. 3 is a cross-sectional view taken along line A-A of FIG. 2.

FIG. 2 is a perspective view illustrating a state where a fuel cell stack is assembled by a fuel cell stack clamping device in accordance with a preferred embodiment of the present invention, and FIG. 3 is a cross-sectional view taken along line A-A of FIG. 2.

As shown in FIG. 3, the present invention aims at providing a fuel cell stack clamping device which includes an oblique device 10, in which a fuel cell stack 12 and an end plate 14 are inserted and fixed in a wedging manner using the inclination of the oblique, to automatically compensate the surface pressure in the fuel cell stack 12 to be maintained constant and provide a large clamping load with a small force.

Figure 5:
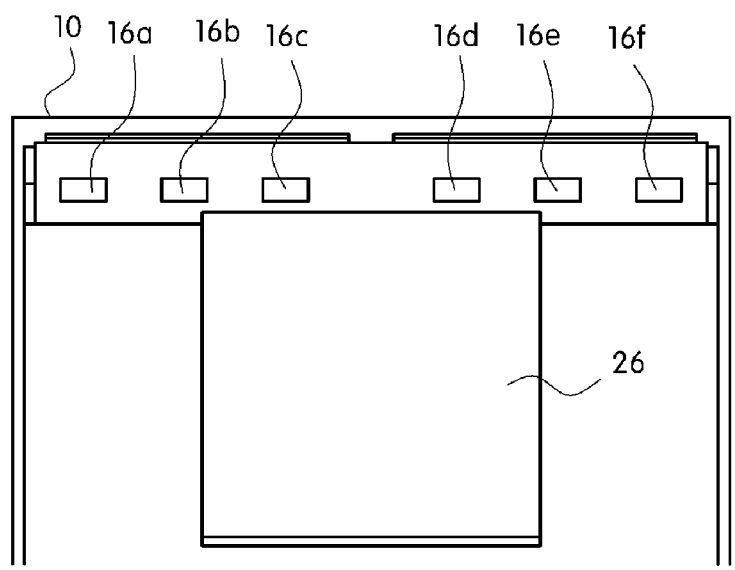
FIG. 5 is an enlarged plan view illustrating an end plate at an end of a fuel cell stack module in a state where the fuel cell stack is assembled by the fuel cell stack clamping device in accordance with the preferred embodiment of the present invention.

The end plate 14 is disposed on both sides of the fuel cell stack 12 and, as shown in FIG. 5, includes a hydrogen supply inlet 16a, an air supply inlet 16b, a coolant supply inlet 16c, a coolant outlet 16d, an air outlet 16e, and a hydrogen outlet 16f, which are formed to be connected to the outside on a top end portion of the end plate 14. The inner surface of the end plate 14 is formed in a straight line in an up-and-down direction to be closely adhered to the both sides of the fuel cell stack 12, and the outer surface is formed in a first oblique 18 having a predetermined inclination.

Due to the first oblique 18, the end plate 14 has a cross-sectional area gradually decreasing from the top to the bottom.

The oblique device 10 includes a body portion 20 formed in the vertical direction, and a bottom plate 22 connecting a bottom end of the body portion 20 and integrally formed with the body portion 20.

In particular, the inner surface of the body portion 20 includes a second oblique 24 that comes in surface contact with the first oblique 18 of the end plate 14.

Accordingly, when the fuel cell stack 12 and the end plate 14 are inserted in the inside the oblique device 10 in a wedging manner, the first oblique 18 of the end plate 14 comes in surface contact with respect to the second oblique 24 of the body portion 20, thus connecting the fuel cell stack 12 and the end plate 14 by the oblique device 10.

The principle that the fuel cell stack clamping device of the present invention provides a large clamping load with a small force will be described with reference to FIG. 4 as follows.

Figure 4:
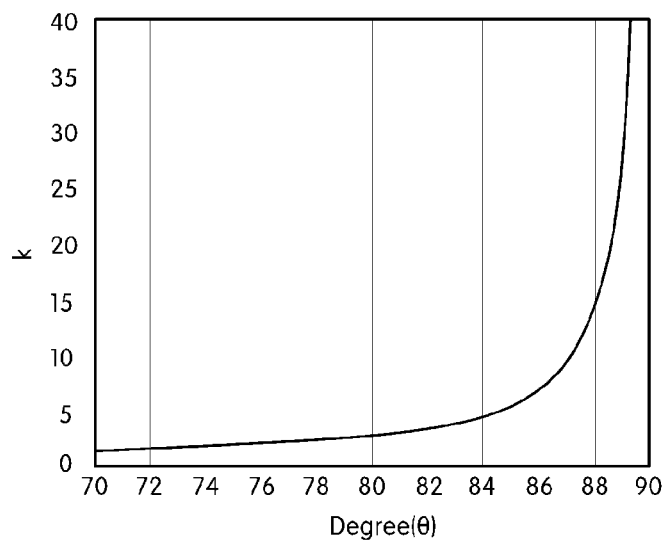
FIG. 4 shows a graph and an equation illustrating the principle and operation of the fuel cell stack clamping device in accordance with the present invention.

The graph in FIG. 4 illustrates an increase in clamping load with respect to the load of the fuel cell stack 12 according to the inclination of the first and second obliques 18 and 24. In the equation of FIG. 4, R represents a repulsive force of the oblique device, $\theta$ represents an inclination of the oblique device, P represents a load of the fuel cell stack 12, and $\Phi/2$ represents a corner angle of the oblique device, and k represents a multiple expressing the load of the fuel cell stack 12 as the clamping load of the fuel cell stack 12.

According to this principle, when the value of the oblique inclination $\theta$ of the oblique device 10 ranges from 80° to 85°, k has a value ranging from 3 to 6, and thus the fuel cell stack 12 can be assembled with a clamping load corresponding to 3 to 6 times the load of the fuel cell stack 12.

According to the fuel cell stack clamping device in accordance with the present invention, as a means for allowing the load of the fuel cell stack 12 to act toward the inside of the fuel cell stack 12, first and second unidirectional load control plates 26 and 28 having a rectangular plate shape may be respectively connected to the top and bottom surfaces of the end plate 14.

Figure 7:
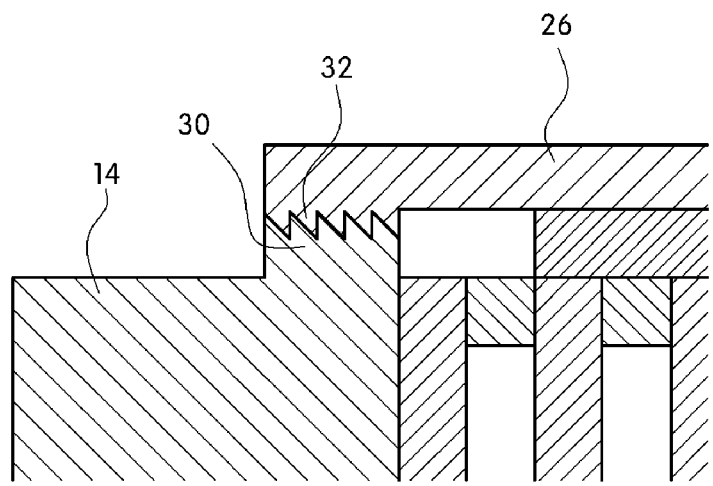
FIG. 7 is a cross-sectional view illustrating a hooking member of a unidirectional load control plate of the fuel cell stack module as a constituent element of the fuel cell stack clamping device in accordance with the preferred embodiment of the present invention.

In more detail, as shown in FIG. 7, when a first locking member 32 formed on the outside bottom surface of the first unidirectional load control plate 26 is engaged with a first hooking member 30 formed on the top surface of the end plate 14 and then the first unidirectional load control plate 26 is pressurized toward the inside of the fuel cell stack 12, the load of the fuel cell stack 12 can be applied only to the inside thereof.

Figure 6:
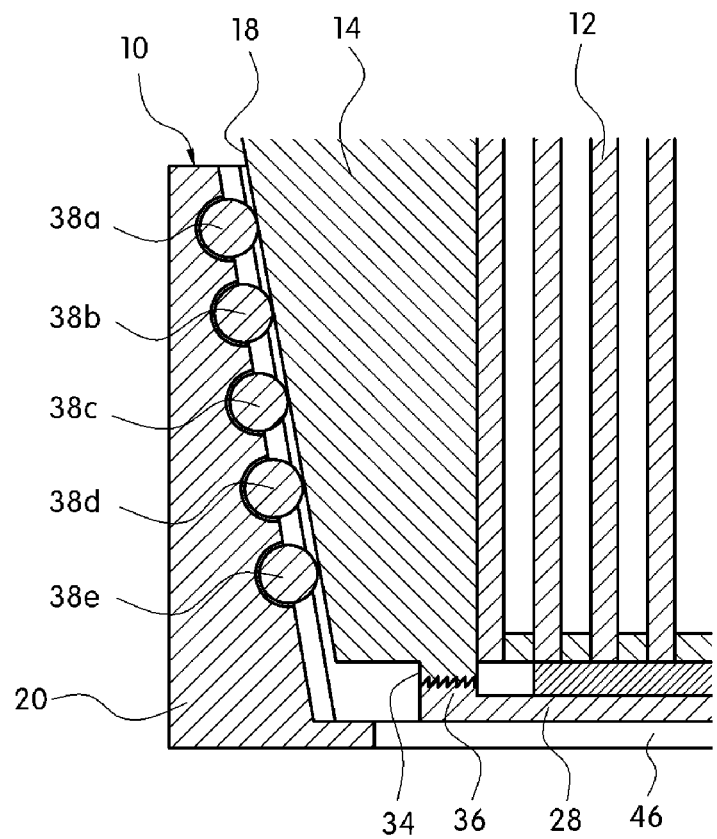
FIG. 6 is a cross-sectional view illustrating an oblique device of the fuel cell stack clamping device in accordance with the preferred embodiment of the present invention.

In the same manner, as shown in FIG. 6, when a second locking member 36 formed on the outside top surface of the second unidirectional load control plate 28 is engaged with a second hooking member 34 formed on the bottom surface of the end plate 14 and then the first unidirectional load control plate 26 is pressurized toward the inside of the fuel cell stack 12, the load of the fuel cell stack 12 can be applied only to the inside thereof more and more.

At this time, in order to connect the second unidirectional load control plate 28, a through-hole 46 is formed on the bottom plate 22 of the oblique device 10. Accordingly, the second unidirectional load control plate 28 can be easily connected to the bottom surface of the end plate 14 exposed through the through-hole 46.

Meanwhile, as shown in FIG. 6, a plurality of cylindrical rollers 38a, 38b, 38c, 38d and 38e are mounted on the second oblique 24 of the oblique device 10. When the end plate 14 is inserted into the oblique device 10 in a wedging manner, the cylindrical rollers 38a, 38b, 38c, 38d and 38e are in rolling contact with the first oblique 18 of the end plate 14 to easily transfer the clamping load toward the inside of the fuel cell stack 12.

As described above, when the first and second unidirectional load control plates 26 and 28 are pressurized toward the inside of the fuel cell stack 12 to connect the fuel cell stack module with a desired clamping force and then a displacement is applied to the fuel cell stack 12 in the gravity direction using the surface contact according to the inclination θ of the first oblique 18 of the end plate 14 and the second oblique 24 of the oblique device 10, it is possible to connect the fuel cell stack 12 with a large clamping load corresponding to k times the load of the fuel cell stack 12.

Moreover, it is possible to automatically compensate the surface pressure in the fuel cell stack 12 to be maintained constant by easily transferring the force corresponding to k times the load of the fuel cell stack 12 to the fuel cell stack module through the cylindrical rollers 38a, 38b, 38c, 38d, 38e.

Figure 8:
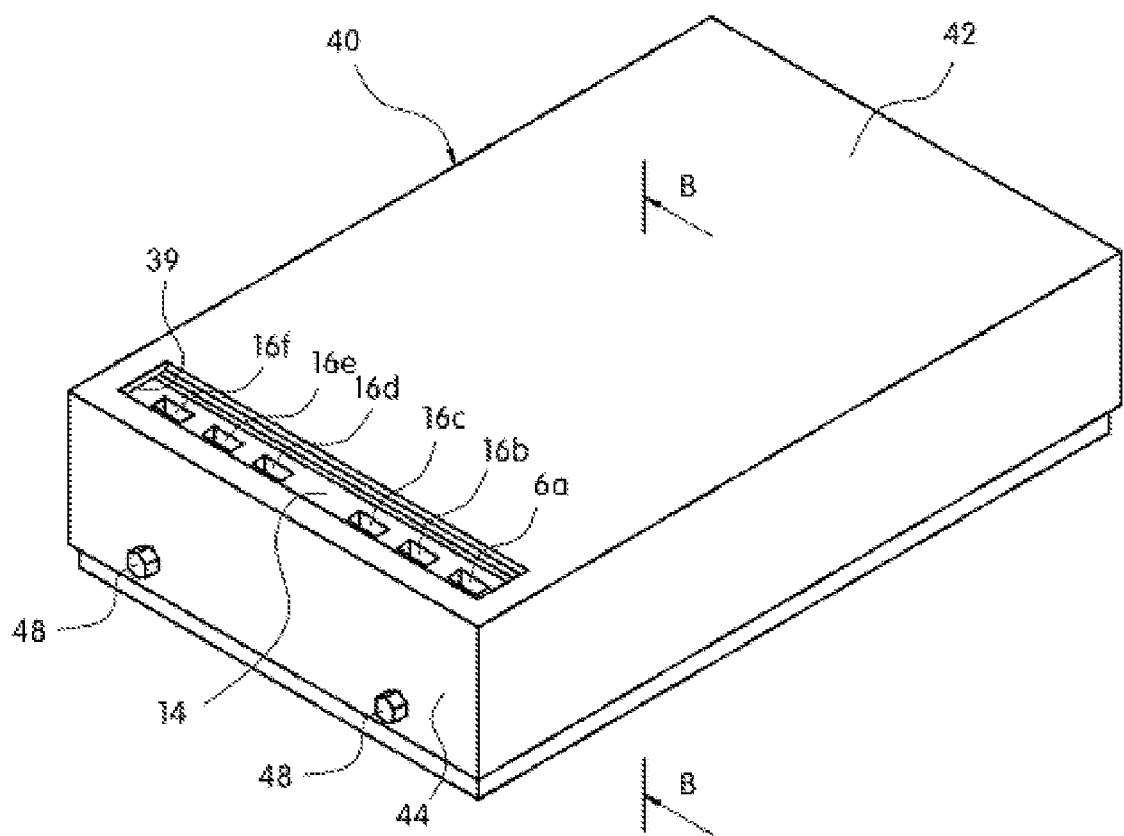
FIG. 8 is a perspective view illustrating a fuel cell stack clamping device in accordance with another preferred embodiment of the present invention.
Figure 9:
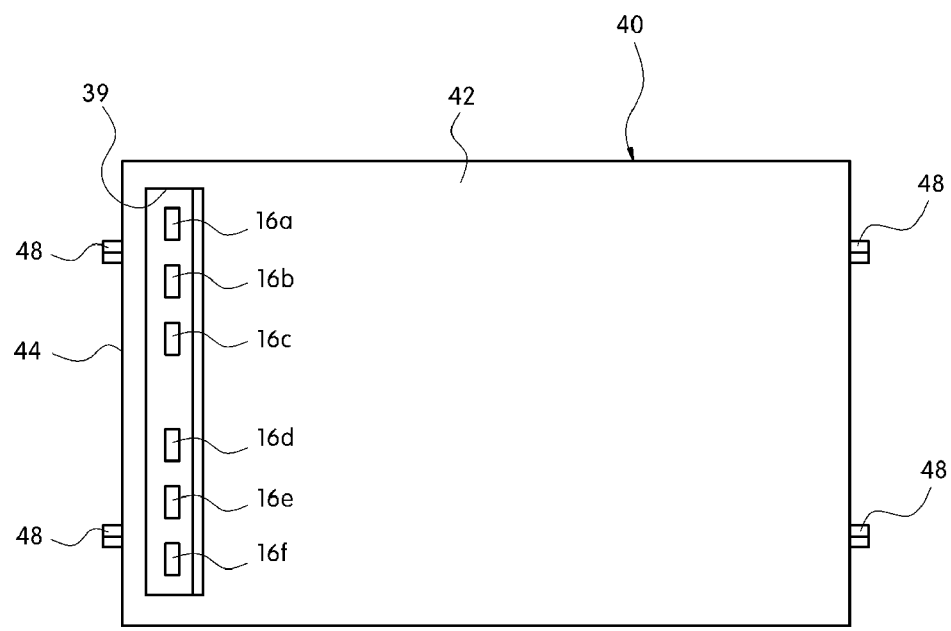
FIG. 9 is a plan view illustrating the fuel cell stack clamping device in accordance with another preferred embodiment of the present invention.
Figure 10:
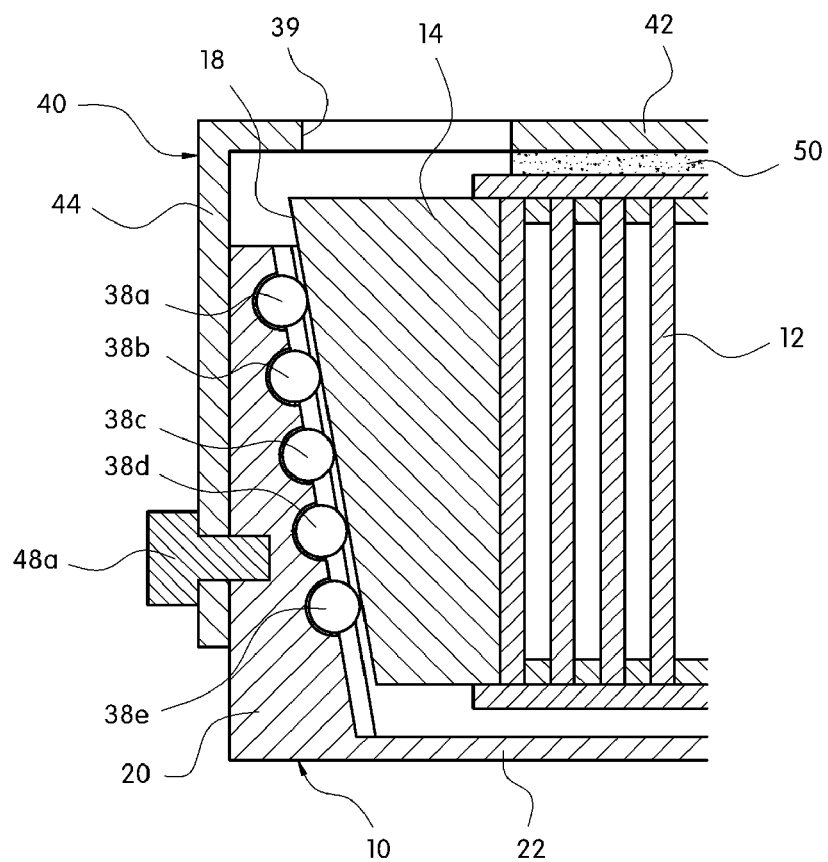
FIG. 10 is a cross-sectional view taken along line B-B of FIG. 8.

In accordance with another preferred embodiment of the present invention, the present invention has a characteristic feature in that a load adding cover 40 capable of covering the fuel cell stack 12, the end plate 14, and the oblique device 10 is further provided FIG. 8 is a perspective view illustrating the fuel cell stack clamping device in accordance with another preferred embodiment of the present invention, FIG. 9 is a plan view thereof, and FIG. 10 is a cross-sectional view taken along line B-B of FIG. 8.

The load adding cover 40 includes a top plate 42 and a side plate 44. The top plate 42 covers the top surface of the fuel cell stack module, the end plate 14, and the oblique device 10, and the side plate 44 covers the circumferential surface of the fuel cell stack module, the end plate 14, and the oblique device 10.

An open hole 39, through which the hydrogen supply inlet 16a, the air supply inlet 16b, the coolant supply inlet 16c, the coolant outlet 16d, the air outlet 16e, and the hydrogen outlet 16f of the end plate 14 are exposed to the outside for pipe laying, is formed on the top plate 42 of the load adding cover 40.

Moreover, the side plate 44 of the load adding cover 40 is connected to the body portion 20 of the oblique device 10 by cover fixing screws 48a, 48b, 48c and 48d, thus maintaining the state where the load adding cover 40 is fixed to the body portion 20 of the oblique device 10.

Accordingly, when the load adding cover 40 is covered, the load and the clamping force of the load adding cover 40 are added to the load of the fuel cell stack module, thus increasing the clamping surface pressure of the fuel cell stack 12.

In preparation for the case where a deviation of the surface pressure of the fuel cell stack 12 may be caused by vibration applied to the fuel cell stack 12 and the end plate 14 during operation of the fuel cell system, a vibration absorbing material 50 capable of absorbing vibration is inserted between the bottom surface of the top plate 42 of the load adding cover 40 and the top surface of the fuel cell stack module.

Accordingly, after the fuel cell stack 12 and the end plate 14 are inserted into the oblique device 10 in a wedging manner, the load of the load adding cover 40 is added to that of the fuel cell stack 12 to provide a desired clamping load to the inside of the fuel cell stack 12, and thus the fuel cell stack 12 can be easily assembled with a constant surface pressure which is automatically compensated.

As described above, the present invention provides effects including the following. First, since the oblique device applied to the outside of the fuel cell stack provides a clamping load with a small force, it is possible to easily connect the fuel cell stack without the use of any additional device in the fuel cell stack module, and further it is possible to automatically compensate the surface pressure in the fuel cell stack to be maintained constant. Moreover, it is possible to simplify the inside structure of the fuel cell stack since an elastic body such as a leaf spring is not employed in the inside of the conventional fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell stack clamping device comprising:
    an end plate having an inner surface formed in a vertical surface to be closely adhered to both sides of a fuel cell stack module and an outer surface formed in a first oblique;
    an oblique device coming in surface contact with the first oblique and accommodating the end plate; and
    first and second unidirectional load control plates respectively connected to the top and bottom surfaces of the end plate such that the load of the fuel cell stack is applied only toward the inside of the fuel cell stack.

2. The fuel cell stack clamping device of claim 1, wherein a first hooking member is formed on the top surface of the end plate, a first locking member engaged with the first hooking member is formed in the outside bottom surface of the first unidirectional load control plate, a second hooking member is formed on the bottom surface of the end plate, and a second locking member engaged with the second hooking member is formed on the outside top surface of the second unidirectional load control plate.

3. The fuel cell stack clamping device of claim 1, wherein a through-hole for connecting the second unidirectional load control plate is formed on a bottom plate of the oblique device.

4. The fuel cell stack clamping device of claim 1, further comprising a load adding cover including a top plate for covering the top surface of the fuel cell stack module, the end plate, and the oblique device, and a side plate for covering the circumferential surface of the fuel cell stack module, the end plate, and the oblique device.

5. The fuel cell stack clamping device of claim 4, wherein an open hole, through which hydrogen inlet and outlet and air inlet and outlet of the end plate are exposed to the outside, is formed on the top plate of the load adding cover.

6. The fuel cell stack clamping device of claim 4, wherein the side plate of the load adding cover and a body portion of the oblique device are connected by cover fixing means.

7. The fuel cell stack clamping device of claim 4, wherein a vibration absorbing material is disposed between the bottom surface of the top plate of the load adding cover and the top surface of the fuel cell stack module.

8. The fuel cell stack clamping device of claim 1, wherein a plurality of cylindrical rollers are installed on the inner surface of the body portion of the oblique device.

9. The fuel cell stack clamping device of claim 1, wherein the oblique device includes a body portion in which a second oblique coming in surface contact with the first oblique of the end plate is formed on the inner surface thereof, and a bottom plate for integrally connecting the bottom end of the body portion.

* * * * *